United States Patent Office 2,885,397
Patented May 5, 1959

2,885,397

6β-HYDROXY-Δ⁴-3-KETO STEROIDS AND PROCESS FOR THE PRODUCTION THEREOF

Carl Djerassi, Birmingham, Mich., Gilbert Stork, Leonia, N.J., and George Rosenkranz and Franz Sondheimer, Mexico City, Mexico, assignors to Syntex, S.A., Mexico City, Mexico, a corporation of Mexico No Drawing. Application July 15, 1954
Serial No. 443,705

Claims priority, application Mexico July 17, 1953

14 Claims. (Cl. 260—239.55)

The present invention relates to novel cyclopentanophenanthrene compounds and to a process for the preparation thereof.

More particularly, the present invention relates to a novel process for producing steroidal 6β-hydroxy-Δ⁴-3-ketones starting from the corresponding 3-enol acylates of the Δ⁴-3-ketones, i.e. the corresponding 3-acyloxy-Δ³,⁵-dienes. The present invention further relates to certain novel steroidal 6β-hydroxy-Δ⁴-3-ketones which are valuable intermediates for the production of known 6β-hydroxy compounds.

Steroidal Δ⁴-3-ketones having an oxygen substituent in position C-6 of the steroid molecule such as a hydroxyl group apparently have a definite function in the metabolism of the living organism since compounds of this type are produced by microbiological oxidation of steroids in accordance with the disclosure of Peterson et al., J.A.C.S., 75, 412 (1953). It therefore is of importance to prepare compounds of this type at least for comparison purposes. Further, certain of these compounds which aside from the oxygen substituent at C-6 correspond to the cortical hormones exhibit a useful anti-corticoid action.

Compounds of this type have been prepared by chemical methods in accordance with Herzig and Ehrenstein, J. Org. Chem., 16, 1050 (1951), and Balant and Ehrenstein, J. Org. Chem. 17, 1587 (1952). These last authors have also described a method for readily converting 6β-hydroxy compounds to 6α-hydroxy compounds. The various chemical methods for the production of these compounds however have been rather difficult and/or prolonged or involved the use of starting materials not readily available.

In accordance with the present invention therefore there has been provided a simple and efficient process for producing in two steps from corresponding steroidal Δ⁴-3-ketones and in one step from enol acylates thereof, steroidal 6β-hydroxy-Δ⁴-3-ketones, and especially members of the pregnane, androstane, spirostant and cholestane series. Further, there has been produced in accordance with the present invention certain novel steroidal 6β-hydroxy-Δ⁴-3-ketones.

The following equation serves to illustrate the process of the present invention:

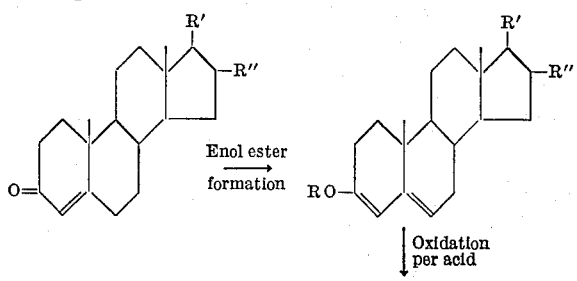

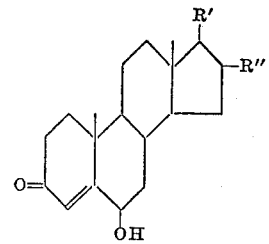

In the above equation RO represents an acyloxy group that may be the residue of any hydrocarbon carboxylic acid conventionally forming steroid esters. Preferably RO represents a lower fatty acid acyloxy group or the benzoyloxy group.

In the above equation if R″ is hydrogen R′ can be any of the side chains conventionally linked to C–17. For example R′ may be a keto group, a hydroxy group or esterified hydroxy group. R′ may also represent alkyl, alkylene, oxy-alkyl, oxy-alkylene, oxo-alkyl, oxo-alkylene, carboxy-alkyl, carbalkoxy-alkyl, acetyl, acyloxy-alkyl, acyloxy-acetal or the dihydroxy acetone side chain. R′ and R″ together can also represent a spiroketal side chain such as that found in the steroidal sapogenins.

In practicing the process above outlined a steroidal Δ⁴-3-ketone is first transformed into the corresponding enol ester by treatment with an enolizing and acylating agent. A preferred agent for this purpose is isopropenyl acetate or other equivalent isopropenyl lower fatty acid compounds, since these compounds under suitable conditions will react with the α,β-unsaturated keto group without affecting the other keto groupings such as a 20-keto group. Other enolizing and acylating agents may be used however such as acid anhydrides in the presence of paratoluene sulfonic acid. Known enol acylates may also be used as starting materials.

For the second step of the above outlined process the steroidal 3-acyloxy-Δ³,⁵-diene compounds of the first step or known compounds are dissolved in an organic solvent such as ether and oxidized with an organic per acid, preferably an aromatic per acid such as perphthalic acid or perbenzoic acid. The resultant compound is the corresponding steroidal 6β-hydroxy-Δ⁴-3-ketone. Thus where testosterone acetate was the starting material treatment in the first step with isopropenyl acetate as hereinafter set forth in detail produced the corresponding enol acetate, i.e. 3,17β-diacetoxy-Δ³,⁵-androstadiene and treatment of this intermediate with perphthalic acid produced the novel 17-monoacetate of Δ⁴-androstene-6β,17β-diol-3-one which could be readily converted to known useful compounds as hereinafter set forth. Similarly, treatment of diosgenone produced the novel 6β-hydroxy-diosgenone (Δ⁴-22a-spirosten-6β-ol-3-one) a valuable intermediate for production of the corresponding 6β-ol compounds of the pregnane series by conventional oxidative degradation of the sapogenin side chain.

The following specific examples serve to illustrate but are not intended to limit the present invention:

Example I 4 g. of testosterone acetate was dissolved in 60 cc. of benzene and 10 cc. of solvent was distilled in order to remove traces of moisture. 25 cc. of isopropenyl acetate and 800 mg. of p-toluenesulphonic acid were added and the mixture was slowly concentrated. After two hours, 25 additional cc. of isopropenyl acetate was added and after a total time of 4.5 hours the concentration was suspended. During this time, the solution was concentrated to approximately ⅔ of its original volume. The mixture was poured into water, extracted with ether and the ether solution was washed with sodium bicarbonate solution and water, dried over sodium sulfate and concentrated to a small volume. Addition of pentane caused the crystallization of 3.4 g. of the enol acetate of testosterone (3,17β-diacetoxy-Δ$^{3,5}$-androstadiene) having a melting point of 143–145° C., [α]$_D$ −129° (chloroform). The substance showed a selective ultraviolet absorption maximum λ max. 234 mμ (log ε 4.24).

1.2 molar equivalents of perphthalic acid dissolved in 30 cc. of ether was added to a solution of 1 g. of the enol acetate of testosterone in 70 cc. of ether and the mixture was kept standing in the dark at room temperature for 72 hours. It was then diluted with ether, washed with sodium carbonate solution and water, dried over sodium sulfate and concentrated until crystallization started. After adding pentane, 300 mg. was obtained of the 17-monoacetate of Δ$^4$-androstene-6β,17β-diol-3-one with a melting point of 206–208° C., [α]$_D$ +24° (chloroform), λ max. 236 mμ (log ε 4.16).

The structure of this compound was proved through the two following reactions: (1) acetylation by routine methods afforded the 6,17-diacetate which on direct comparison resulted to be identical to the one prepared in accordance with the method described in the United States application, Serial No. 406,571, filed January 27, 1954; (2) oxidation with chromic acid yielded the acetate of 6-keto-testosterone whose properties agreed with those published for this compound by Butenandt and Riegel (Berichte, 69, 1163, 1936).

*Example II*

4 g. of the enol acetate of cholestenone (3-acetoxy-Δ$^{3,5}$-cholestadiene) (see, for example, Westphal, Berichte, 70, 2128, 1937) was oxidized with 1.2 molar equivalents of perphthalic acid in accordance with the method described in Example I, thus giving 1.4 g. of 6β-hydroxy-cholestenone (6β-hydroxy-Δ$^4$-cholesten-3-one) having a melting point of 192–193° C., identical to an authentic sample.

*Example III*

4 g. of diosgenone (Δ$^4$-22a-spirosten-3-one) was transformed into the enol acetate (3-acetoxy-Δ$^{3,5}$-22a-spirostadiene) by the method described in Example I. Recrystallization from acetone-hexane gave the pure compound having a melting point of 195–197° C., [α]$_D$ −8° (chloroform).

3 g. of this enol acetate was oxidized with 1.2 molar equivalents of perphthalic acid by the method described in Example I, thus yielding 1.3 g. of 6β-hydroxy-diosgenone (Δ$^4$-22a-spirosten-6β-ol-3-one) having a melting point of 228–231° C., [α]$_D$ −67° (chloroform), λ max. 238 mμ (log ε 4.09).

*Example IV*

The 3-mono enol acetate of progesterone (3-acetoxy-Δ$^{3,5}$-pregnadiene-20-one) was prepared in accordance with the method described in Example I. It had a melting point of 132–134° C., [α]$_D$ −24° (chloroform), λ max. 234 mμ (log ε 4.24).

1.9 g. of the 3-mono enol acetate of progesterone (3-acetoxy-Δ$^{3,5}$-pregnadien-20-one) was oxidized with 1.3 molar equivalents of perphthalic acid following the method described in Example I, thus giving, after crystallization from acetone-hexane, 600 mg. of 6β-hydroxy-progesterone (Δ$^4$-pregnene-6β-ol-3,20-dione) having a melting point of 177–179° C., λ max. 236 mμ (log ε 4.18), identical to an authentic sample.

*Example V*

The preparation of the 3-mono enol acetate of desoxycorticosterone (3,21 - diacetoxy-Δ$^{3,5}$-pregnadien-20-one) was carried out starting from 4 g. of desoxycorticosterone acetate (acetate of Δ$^4$-pregnene-21-ol-3,20-dione) in accordance with the method described in Example I. This compound was obtained in the form of an oil which could not be crystallized. 4 g. of this crude oily product was dissolved in 300 cc. of ether and oxidized with 1.2 molar equivalents of perphthalic acid following the method described in Example I. Purification of the crude product by chromatography in a column of activated alumina afforded 600 mg. of the 21-monoacetate of 6β-hydroxy-desoxycorticosterone (the 21-monoacetate of Δ$^4$-pregnene-6β,21-diol-3,20-dione) having a melting point of 195–197° C., λ max. 236 mμ (log ε 4.19), identical to an authentic sample.

We claim:

1. A process for the production of steroidal 6β-hydroxy-Δ$^4$-3-ketones selected from the group consisting of compounds of the androstane series, compounds of the pregnane series, compounds of the spirostane series and compounds of the cholestane series which comprises oxidizing with an organic per acid the corresponding steroidal 3-acyloxy-Δ$^{3,5}$-diene selected from the group consisting of 3-lower fatty acid acyloxy and 3-benzoyloxy compounds.

2. The process of claim 1 wherein the organic per acid is an aromatic per acid.

3. The process of claim 1 wherein the organic per acid is perphthalic acid.

4. The process of claim 1 wherein the organic per acid is perbenzoic acid.

5. The process of claim 1 wherein the steroidal ketone is a member of the androstane series.

6. The process of claim 1 wherein the steroidal ketone is a member of the pregnane series.

7. The process of claim 1 wherein the steroidal ketone is a member of the spirostane series.

8. The process of claim 1 wherein the steroidal ketone is a member of the cholestane series.

9. A process for the production of the 17-monoacetate of Δ$^4$-androstene-6β,17β-diol-3-one which comprises oxidizing 3,17β-diacetoxy-Δ$^{3,5}$-androstadiene with perphthalic acid.

10. A process for the production of Δ$^4$-pregnene-6β-ol-3,20-dione which comprises oxidizing 3-acetoxy-Δ$^{3,5}$-pregnadiene-20-one with perphthalic acid.

11. A process for the production of the 21-monoacetate of Δ$^4$-pregnene-6β,21-diol-3,20-dione which comprises oxidizing 3,21-diacetoxy-Δ$^{3,5}$-pregnadiene-20-one with perphthalic acid.

12. A process for the production of Δ$^4$-22a-spirosten-6β-ol-3-one which comprises oxidizing 3-acetoxy-Δ$^{3,5}$-22a-spirostadiene with perphthalic acid.

13. A process for the production of 6β-hydroxy-Δ$^4$-cholesten-3-one which comprises oxidizing 3-acetoxy-Δ$^{3,5}$-cholestadiene with perphthalic acid.

14. Δ$^4$-22a-spirosten-6β-ol-3-one.

References Cited in the file of this patent

UNITED STATES PATENTS 2,683,725    Murray et al. _____ July 13, 1954